United States Patent [19]
Ha

[11] Patent Number: 6,062,595
[45] Date of Patent: May 16, 2000

[54] AIR BAG MODULE COVER HAVING BACKLIGHTED REDUNDANT CONTROL SWITCHES

[75] Inventor: Chi Thi Ha, Dayton, Ohio

[73] Assignee: General Motors Corporation, Detroit, Mich.

[21] Appl. No.: 09/065,842

[22] Filed: Apr. 24, 1998

[51] Int. Cl.[7] .................................................. B60R 21/16
[52] U.S. Cl. .................. 280/731; 280/728.1; 280/728.2; 200/61.54
[58] Field of Search ................................ 280/728.1, 731, 280/728.2, 728.3; 200/61.54, 313, 513

[56] References Cited

U.S. PATENT DOCUMENTS

| | | | |
|---|---|---|---|
| 4,811,175 | 3/1989 | DeSmet | 362/95 |
| 4,934,735 | 6/1990 | Embach . | |
| 5,002,306 | 3/1991 | Hiramitsu et al. | 280/731 |
| 5,397,867 | 3/1995 | Demeo | 200/5 A |
| 5,499,841 | 3/1996 | Trojan et al. | 280/731 |
| 5,542,694 | 8/1996 | Davis . | |
| 5,558,364 | 9/1996 | Davis | 280/728.3 |
| 5,569,893 | 10/1996 | Seymour | 200/61.54 |
| 5,573,268 | 11/1996 | Leonelli | 280/731 |
| 5,607,048 | 3/1997 | Kaizu et al. | 200/314 |
| 5,711,588 | 1/1998 | Rudisill | 362/30 |
| 5,747,756 | 5/1998 | Boedecker | 200/5 A |
| 5,762,365 | 6/1998 | Worrell et al. | 280/731 |
| 5,767,466 | 6/1998 | Durrani | 200/61.54 |
| 5,775,728 | 7/1998 | Niwa et al. | 280/728.3 |
| 5,822,690 | 10/1998 | Rynk et al. | 455/351 |

*Primary Examiner*—Eric Culbreth
*Assistant Examiner*—L. Lum
*Attorney, Agent, or Firm*—Kathryn A. Marra

[57] ABSTRACT

An air bag cover assembly having backlighted redundant control switches includes membrane switch circuits and translucent backing plates mounted to posts molded to an air bag cover. The redundant control switches are utilized to control functions of electrical components within the vehicle. The membrane switching circuits are mounted within the cover and include translucent buttons projecting therefrom through apertures in the cover. The translucent backing plate includes LED's disposed therein for transmitting light through the buttons. The buttons further include symbols corresponding to a function. The translucent backing panel further includes a reflective material applied to the backside thereby causing the transmitted light to be directed to the buttons.

11 Claims, 3 Drawing Sheets

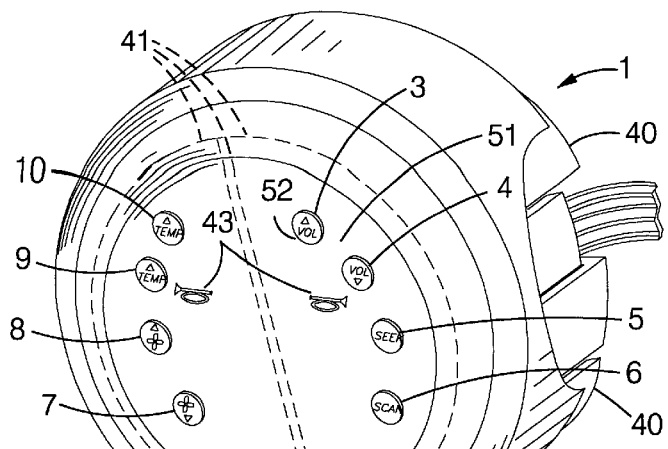
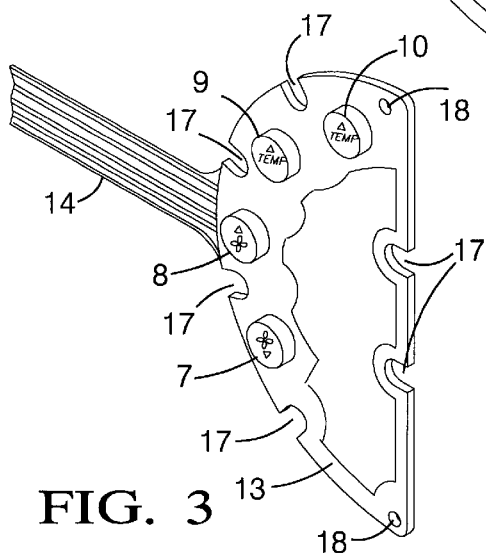
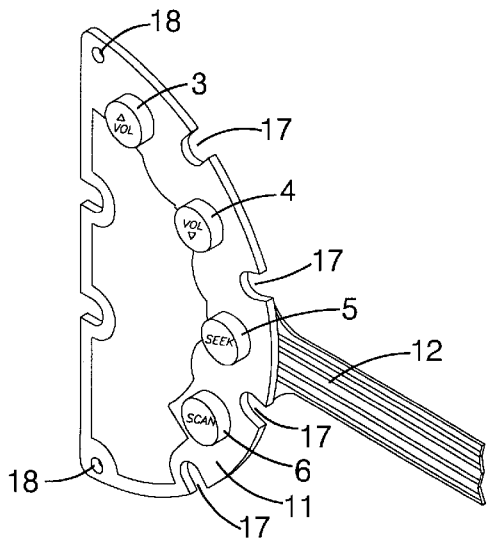
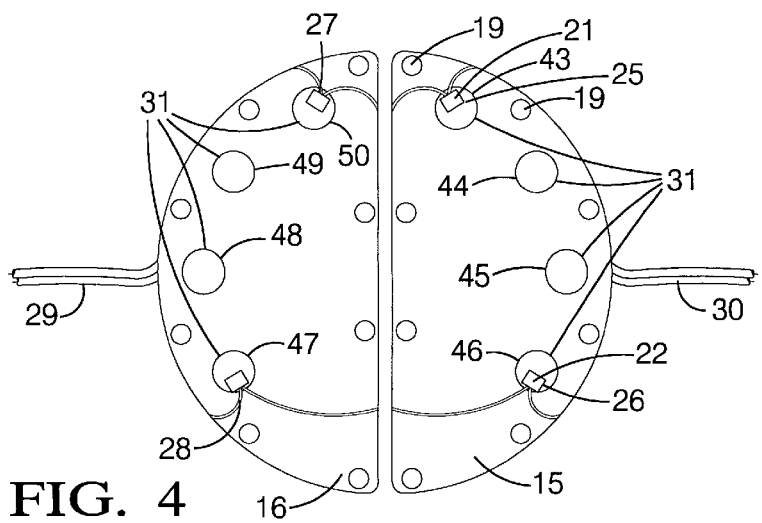
FIG. 1
FIG. 3
FIG. 2
FIG. 4

6,062,595

AIR BAG MODULE COVER HAVING BACKLIGHTED REDUNDANT CONTROL SWITCHES

TECHNICAL FIELD

This invention relates generally to electronic controls for a vehicle. In particular, this invention relates to an air bag module cover having backlighted redundant control switches.

BACKGROUND OF THE INVENTION

It is well known in the design and manufacture of vehicles to place a second set of switches to control various electrical components within easy reach of the driver. These switches, commonly called redundant controls, are placed on the dashboard or steering wheel cover and operate to control a radio, heater, cruise control, cell phone, air conditioning and the like.

One type of steering wheel mounted redundant control switches of the prior art is one where the switches are mounted to the backside of the driver air bag and protrude through openings in the air bag cover. Another type is one where separate switch buttons are disposed within the mounting plate of the steering wheel. Still another prior art configuration mounts separate switches in a pocket located at the spoke of the steering wheel.

Included among the prior art are redundant control switches using light sources to achieve backlighting to increase visibility of the switches and ease operator use. Many of these switches utilize incandescent bulbs or fiber optics for a light source.

SUMMARY OF THE INVENTION

This invention offers advantages and alternatives over the prior art by providing air bag cover mounted redundant control switches which utilize an inexpensive, reliable switch type which can be mounted to the backside of an air bag cover including a lighting source to provide backlighting to the redundant switches in a space efficient and cost efficient manner.

The redundant control switches of the present invention are preferably membrane type switches mounted to the backside of an air bag cover actuated by buttons accessible by the driver on the front side of the air bag cover. The preferred air bag cover mounted redundant control switches advantageously include a solid state backlighting system having a thin cross section mounted to a rigid backing plate.

The above discussed and other features and advantages of the present invention will be appreciated and understood by those skilled in the art from the following detailed description and drawings.

BRIEF DESCRIPTION OF THE DRAWINGS

The present invention will now be described, by way of example only, with reference to the accompanying drawings wherein like elements are numbered alike in the several Figures:

FIG. 1 is an isometric view in partial section of an air bag module cover having backlighted redundant control switches;

FIG. 2 is an isometric view of a membrane switching circuit showing the backlighted redundant switches;

FIG. 3 is an isometric view of a membrane switching circuit showing the backlighted redundant switches;

FIG. 4 is a plan view of a pair of backing plates showing the backlighting elements;

DESCRIPTION OF THE PREFERRED EMBODIMENT

Figure 5:
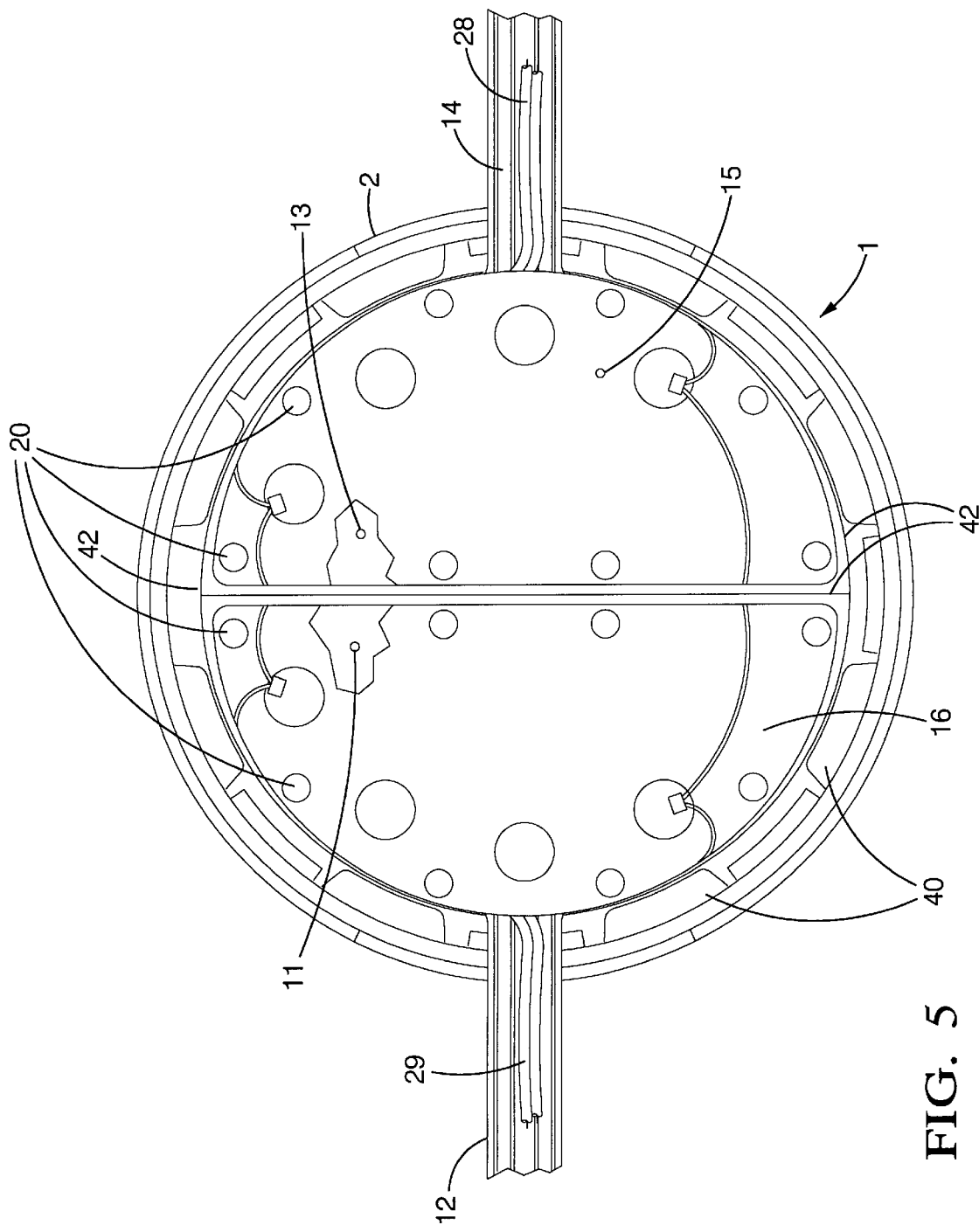
FIG. 5 is a plan view in partial section of an air bag module cover in accordance with the present invention.

Referring to FIG. 1 there is shown an air bag cover assembly, generally designated as 1, including cover 2 and redundant control switch buttons 3–10 protruding through apertures in panel 51 of the cover 2. The air bag cover assembly 1 is generally installed in the center hub portion of a steering wheel (FIG. 6) housing and covers a driver side air bag (FIG. 7).

A membrane switch circuit 11, as best shown in FIG. 2, includes membrane switching circuitry as is well known in the art and includes buttons 3–6 protruding therefrom and corresponding to redundant control switches within the circuit. Signals from the switches are communicated to various electrical components in the vehicle via wires 12 connected to the vehicle wire harness (not shown). Buttons 3–6 are shown by way of example in FIG. 2 for controlling a radio (not shown) whereby buttons 3, 4 would be utilized to control volume and buttons 5, 6 would control tuning functions. A similar membrane switch circuit 13, as best shown in FIG. 3, may by way of example include buttons to control a climate control system (not shown) whereby manipulation of buttons 9, 10 would send electrical signals via wires 14 to control temperature settings and buttons 7, 8 would similarly control fan speed.

The relatively flexible membrane switch circuits 11, 13 are supported within air bag cover 2 by a rigid backing plates 15, 16 as best shown in FIG. 4. The membrane switch circuits 11, 13 include mounting slots 17 and mounting holes 18 and, as shown in FIG. 1, are installed within the cover 2 adjacent the inside surface of panel 51 with buttons 3–10 protruding partially through access holes 16 in cover 2. Backing plates 15, 16 are similarly installed within cover 2 and include mounting holes 19 which, in combination with mounting slots 17 and mounting holes 18 in the membranes 11, 13 engage pins 20 integrally molded into a forward facing side of cover 2 as best shown in FIG. 5. Membranes 11, 13 and the backing plates 15, 16 are fixedly attached within cover 2 by the staking of pins 20.

Referring to FIG. 4, backing plates 15, 16 also include low profile lighting elements 21–24. In an embodiment of the present invention backing plates 15, 16 are advantageously comprised of a rigid translucent material such as acrylic or polycarbonate sheet approximately 2 mm thick and have integrally formed pockets 25–28 formed therein for installation of lighting elements 21–24 respectively therein. Lighting elements 21–24 advantageously comprise LED's having a thickness which allows for the LED's to be imbedded within pockets, 25–28. Electrical power is supplied to lighting elements 21–24 via wires 29, 30 connected to the vehicle wiring harness (not shown) causing the LED's to emit light as is known in the art. Backing plates 15, 16 also include a reflective material 31 applied to the opposing side at areas 43–50 corresponding to buttons 3–10. Light emitted by LED's 21–24 travels within the plane defined by the translucent material of backing plates 15, 16 and is reflected out of the plane and toward the buttons by the reflective material 31 positioned at areas 43–50. The buttons advantageously are comprised of a primarily translucent material which allows for the light to be transmitted from the backing plates 15, 16 and through the buttons 3–10. As shown in FIG. 1, the end of the buttons 3–10 protruding through a panel 51 of cover 2 are partially covered with a coating in the outline of an appropriate indicia. This coating blocks a portion of the light causing the indicia to be illuminated for the identification of the operator. For example, button 3 is covered with a light blocking coating in areas 52 in the shape of an arrow and the letters V, O, L corresponding to a control for increasing the volume on a radio. Light emitted through the button causes the non-coated areas to be illuminated and the coated areas to be dark creating a readable outline of the indicia. The indicia or symbols may also be displayed by applying the coating material opposite to that described herein above thereby illuminating the symbol area and blocking out the remainder of the end of the button.

In operation, buttons 3–10 of the redundant control switches of the present invention are visually illuminated to an operator of a vehicle as protruding through cover 2 of air bag assembly 1. An operator is alerted to a desired redundant control switch button by the symbol illuminated by the backlighting supplied by the LED's 21–24 as transmitted through the buttons 3–10. An operator effects control of an electrical component (not shown) by depressing one of the backlit buttons 3–10 protruding through cover 2 of air bag cover assembly 1.

Figure 6:
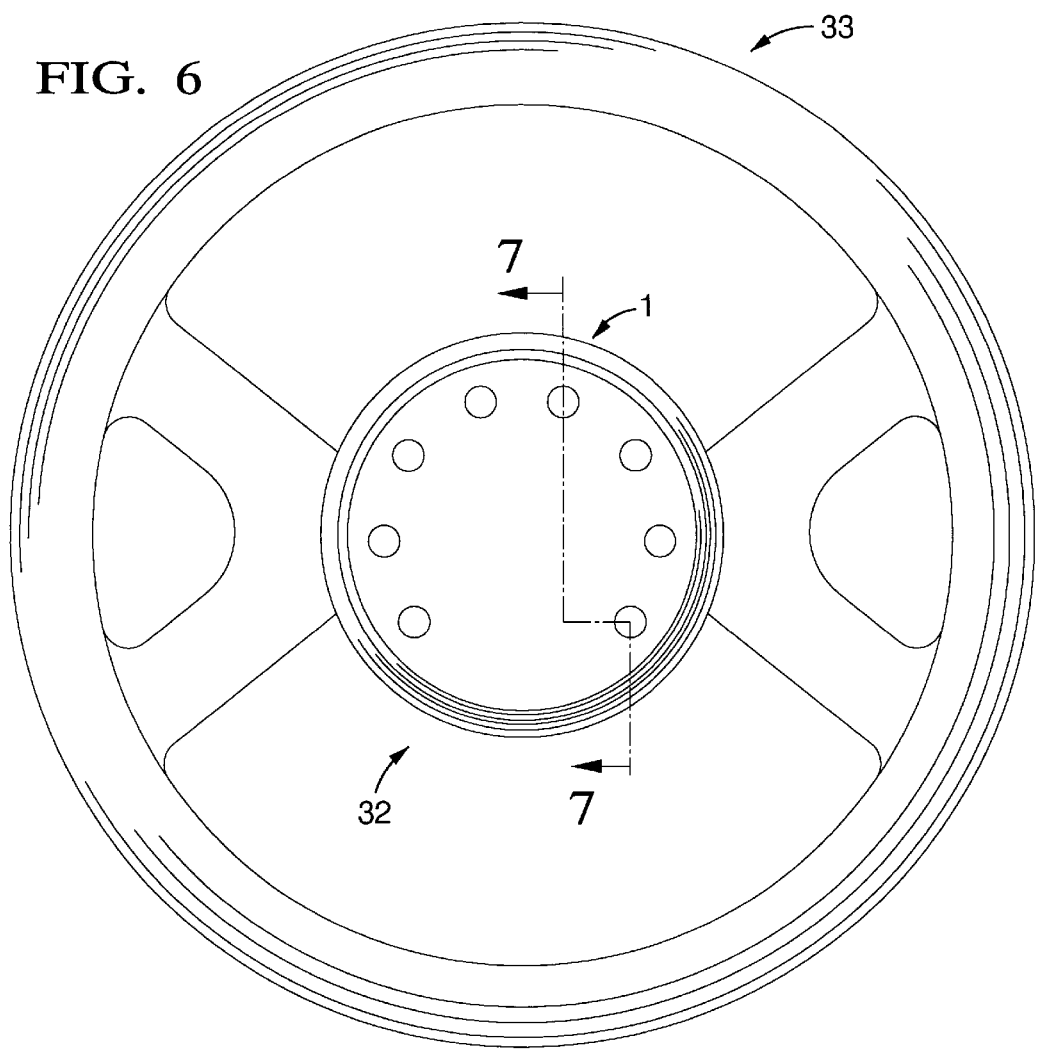
FIG. 6 is a plan view of a steering wheel showing an air bag module cover in accordance with the present invention installed therein.
Figure 7:
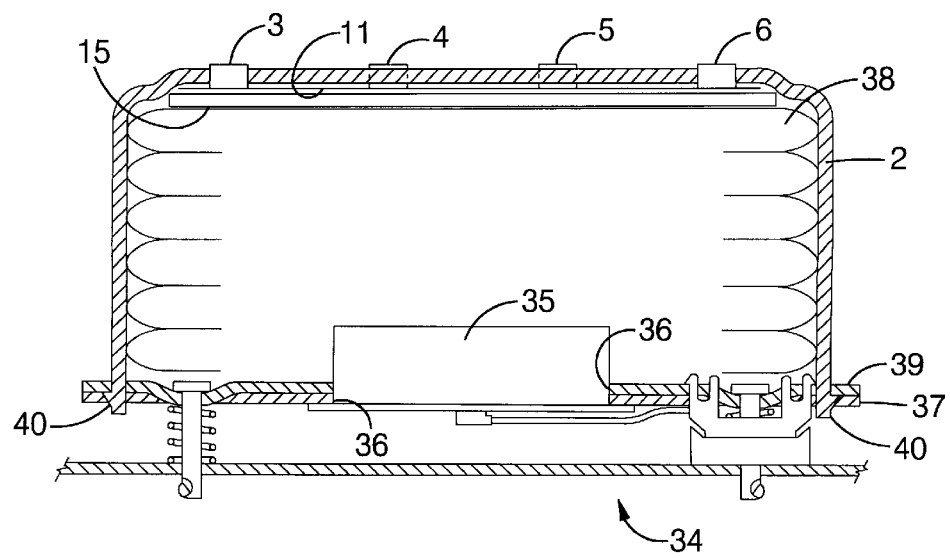
FIG. 7 is a cross section view of an air bag module cover taken substantially along line 7—7 in FIG. 6.

The air bag cover assembly 1 is mounted to a hub portion 32 of the vehicle steering wheel shown generally as 33 in FIG. 6. The relatively thin profile of membranes switch circuits 11, 13 and lighted backing plates 15, 16 advantageously fits within air bag cover 2 without obstructing the installation or operation of the air bag or its components as best shown in FIG. 7. The air bag module generally shown as 34 within cover 2 includes an inflator 35 for generating inflator gas upon the sensing of predetermined vehicle conditions. The inflator 35 is mounted within a central opening 36 of an annular backing plate 37. The inflator 35 may be of any conventional construction. The air bag module 34 further includes an air bag 38 made of a fabric material and connected to the base plate 39 and inflator 35 and functions in a well known manner.

In addition, the air bag module 34 includes an air bag cover 2 attached to the base plate 39 in a suitable manner, such as by tabbed fasteners 40. The cover 2, as described herein above, is preferably integrally molded of a single layer of plastic material and thus is relatively easy to manufacture. However, it will be appreciated that the cover 2 could also be comprised of more than one layer and could include an outer decorative cover layer, such as a urethane foam material. The cover 2 overlies the air bag 38 and inflator 35 and maintains the air bag 38 in a folded condition prior to air bag deployment. As shown in FIG. 1, an exemplary tear pattern represented by dashed line 41 is shown. The dashed lines 41 are representative of thinned sections 42 of the air bag cover 2 as best shown in FIG. 5 which will tear during deployment of the air bag 38, as is well known in the art. It will be appreciated that the tear pattern shown in FIG. 1 is by way of example only and that other tear patterns may be employed with the present invention. Another advantage of the present invention is that the membranes 11, 13 and backing plates 15, 16 are shaped along their periphery to generally coincide with the tear pattern 41 and permit an unencumbered deployment of air bag 38. As best shown in FIG. 5 the two backing plates 15, 16 lie inside of thinned sections represented by lines 42. With reference to FIG. 1 cover 2 includes indicia 43 on the outside surface of panel 51 of cover 2 representing an area for activation of the vehicle's horn (not shown).

It will be understood that a person skilled in the art may make modifications to the preferred embodiments shown herein within the scope and intent of the claims. While the present invention has been described as carried out in a specific embodiment thereof, it is not intended to be limited thereby but is intended to cover the invention broadly within the scope and spirit of the claims.

What is claimed is:

1. An air bag cover assembly for installation in a vehicle, the vehicle having an air bag assembly on a steering wheel, the air bag cover assembly comprising:

an air bag cover mounted at the steering wheel covering the air bag assembly including a panel having an inside surface and an outside surface, the panel having at least one aperture positioned therein;

at least one membrane switch circuit having at least one actuation button projecting therefrom, the button is comprised of a translucent material, the circuit disposed on the inside surface of the panel and the button disposed within the aperture; and at least one rigid translucent backing plate installed adjacent the at least one membrane switching circuit, the backing plate having a lighting element disposed therein transmitting light through the button, wherein the air bag cover includes retaining members extending therefrom for securing the at least one membrane switch circuit and the at least one backing plate.

2. An air bag cover assembly as set forth in claim 1 further comprising:

a plurality of pins projecting from the inside surface of the panel and the at least one membrane switching circuit including mounting slots engaging the pins.

3. An air bag cover assembly as set forth in claim 1 wherein the button is comprised of a translucent material, the cover assembly further comprising:

the at least one rigid translucent backing plate having a front side and a back side, the front side of the backing plate installed adjacent the at least one membrane switching circuit, the backing plate having a light reflective material disposed on the backside coninci-dent with the at least one button, the backing plate having at least one light emitting diode disposed therein transmitting light through the at least one button; and the backing plate further including a plurality of mounting holes engaging the pins extending from the inside surface of the panel.

4. An air bag cover assembly as set forth in claim 1 wherein the at least one switching circuit controls at least one function of at least one vehicle component and the actuation button includes an indicia symbol disposed thereon corresponding to the function.

5. An air bag cover assembly including backlighted redundant control switches for controlling a plurality of functions of electrical components in a vehicle, the vehicle having an air bag assembly mounted on a steering wheel, the air bag cover assembly comprising:

an air bag cover mounted on the steering wheel covering the air bag assembly including a panel having an inside surface and an outside surface, a plurality of pins projecting from the inside surface, the panel having a plurality of apertures positioned therein;

the redundant control switches comprising a plurality of membrane switch circuits, the circuits having mounting slots engaging the pins so that the circuits are disposed adjacent to the inside surface of the panel;

a plurality of actuation buttons projecting from the membrane switch circuits, each button controlling a function and having an indicia positioned on an end corresponding to the function, the buttons disposed within the apertures with the ends adjacent to the outside surface of the panel; and at least one backing plate having mounting holes engaging the pins disposed against the membrane switch circuits comprised of rigid translucent material, the at least one backing plate having at least one light emitting diode disposed therein transmitting light through the buttons thereby backlighting the indicia, the at least one backing plate disposed adjacent to the circuits.

6. An air bag cover assembly as set forth in claim 5 wherein the pins are received within the mounting holes of the circuits and the at least one backing plate thereby retaining the membrane switch circuits and at least one backing plate about the pins projecting from the inside surface.

7. An air bag cover assembly as set forth in claim 1 wherein the cover includes tear seams formed therein to define a tear pattern, the at least one membrane switching circuit having a periphery corresponding to the tear pattern.

8. An air bag cover assembly as set forth in claim 5 wherein the cover includes tear seams formed therein to define a tear pattern, the at least one membrane switching circuit having a periphery corresponding to the tear pattern.

9. An air bag cover assembly as set forth in claim 1 wherein the lighting element comprises a light emitting diode.

10. An air bag cover assembly as set forth in claim 1 wherein the at least one backing plate includes at least one integrally formed pocket used to hold the lighting element, the at least one pocket being in alignment with the at least one button so that the lighting element is adjacent to the at least one button.

11. An air bag cover assembly as set forth in claim 1 wherein the at least one membrane switch circuit controls at least one function of at least one vehicle component and the at least one button includes an indicia symbol disposed thereon corresponding to the function.

\* \* \* \* \*